Nov. 11, 1958  M. P. BABCOCK  2,859,582
ROTARY LAWN MOWER BLADE STRUCTURE
Filed Aug. 10, 1956

INVENTOR.
Maurice P. Babcock
BY
Sam J. Slotsky
ATTORNEY

United States Patent Office 2,859,582
Patented Nov. 11, 1958

2,859,582
ROTARY LAWN MOWER BLADE STRUCTURE

Maurice P. Babcock, Springfield, S. Dak.

Application August 10, 1956, Serial No. 603,377

1 Claim. (Cl. 56—295)

My invention relates to a rotary lawn mower blade structure.

An object of my invention is to provide such a structure in which a pair of horizontally positioned blades having sharpened edges are pivoted at the terminals of a radially positioned bar which is rotated, such blades being pivotally mounted whereby they will be urged radially through centrifugal action, and will perform the cutting action in an efficient manner, and yet will yield slighlty when striking obstructions and the like, to thereby protect the sharpened edges of the blades.

A further object of my invention is to provide a pivoted blade structure of this type in which the blade includes a pair of sharpened edges at either side thereof, so that either side can be used when one side becomes dulled, with the sharpened edges being arranged so that they will be in the same relative position even when reversed.

A further object of my invention is to provide a novel method, and alternative methods of attaching or detaching the blades, with such methods always being in position on the structure so that the detaching and attaching means will not become lost or misplaced.

Figure 1:
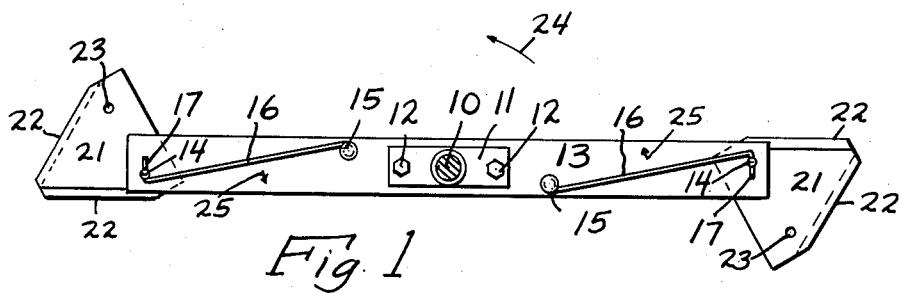
Figure 2:
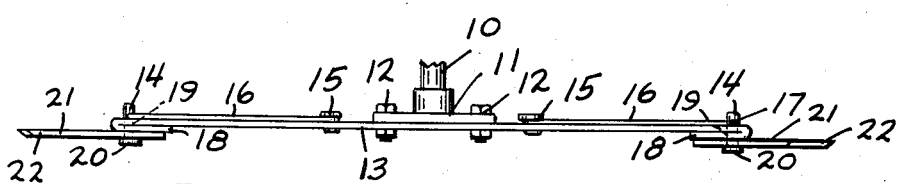
Figure 3:
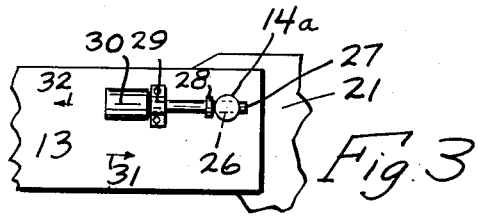
Figure 5:
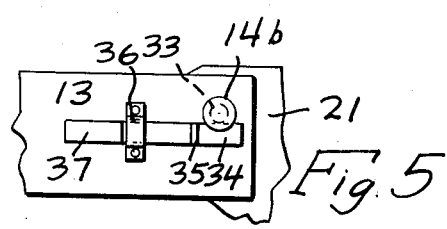
Figure 4:
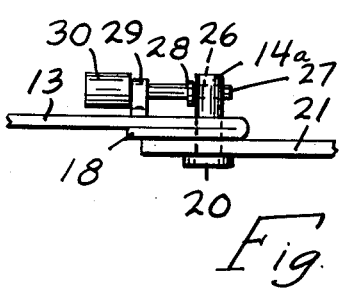
Figure 6:
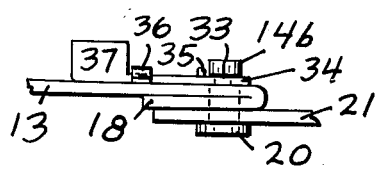

With these and other objects in view, my invention consists in the construction, arrangement, and combination of the various parts of my device, whereby the objects contemplated are attained, as hereinafter more fully set forth, pointed out in my claim, and illustrated in the accompanying drawings, in which:

Figure 1 is a plan view with parts broken away and shown in section of the blade structure as it would appear beneath the platform of a mower carrying the structure, Figure 2 is a side elevation of Figure 1, Figure 3 is an enlarged fragmentary plan view of a modified form, Figure 4 is an elevational view of Figure 3, Figure 5 is a further modification, and Figure 6 is an elevational view of Figure 5.

My invention contemplates the provision of a rotary lawn mower blade structure in which certain features are present, namely, pivotally mounted cutting blades which are centrifugally urged outwardly etc., and with certain locking features whereby the blades can be readily removed and replaced when required, especially for interchanging the cutting edges of the blades, and contemplates further the provision of convenient attaching or detaching means for locking the pins upon which the blades swing in a convenient manner, and whereby the unlocking and locking elements will always be in place ready for use.

I have used the character 10 to designate the shaft of a rotary lawn mower, which usually passes through a horizontally positioned platform, the shaft being driven by the usual motor, the motor, platform and other portions not necessarily being shown herein since they are well-known in the art.

The shaft 10 is attached to the further member 11 which is bolted at 12 to the transverse bar 13 of my invention. The character 14 indicates a pair of pins, and attached at 15 to the bar 13 are the heavy wire springs 16 having the inwardly bent terminals 17 which pass through the pins 14.

The extremities of the bar 13 are bent into the further portions 18, and passing through the bar 13 and the portions 18 are the openings 19 which receive the pins 14, the pins 14 having the expanded heads 20.

The cutting blades of my invention are indicated by the character 21 and are approximately triangular in shape as shown, and include the sharpened edges at 22 at either side thereof, it being noted that the edges are on opposite sides of the members 21 so that when the blades are reversed, as will be explained, they will occupy the same relative position in the cutting action, namely, the edges will taper downwardly from the upper flat surface of the blade in all cases.

The members 21 include a pair of openings 23, either opening of which can be used to receive the aforesaid pins 14.

It will now be noted that when the shaft 10 rotates the structure in the direction of the arrow 24, as shown in Figure 1, the forward edges 22 will cut the grass as the lawn mower travels forwardly, it being noted furthermore that the momentum imparted by the pivoting of the members 21 to the bar 13 will tend to throw the members 21 to the approximate position shown in Figure 1, or to a position slightly beyond that shown, due to the center of mass of each member 21, and in this manner the blades will efficiently cut the grass, with the sharpened edges being approximately radially positioned, and upon encountering unduly heavy weeds or other objects, the blades will not become dulled too quickly due to the fact that they will be urged against the direction of motion due to the pivotal action thereof when such obstructions are encountered.

As a result, the blades will function for a relatively long time, and when one edge is dulled, the blades can be reversed so that the other edge will function, by merely moving the spring wire elements 16 in the direction of the arrows 25 so that the portions 17 will become disengaged from the pins 14, allowing removal of the pins and allowing the blades to be replaced, with the pins 14 in the other openings, whereby the other side edge will be used. In this manner all of the operating parts of the blades are always in place and cannot become lost.

Figures 3 to 6 illustrate further modifications wherein the same blade structures are employed except that the pins are retained by means of centrifugally operated further pins or slides.

In Figures 3 and 4 a further pin 14a includes an opening 26 receiving the further small pin 27 having a shoulder 28, the pin 27 passing through a keeper 29, and attached at the end of the pin 27 is the relatively heavy weighted portion 30.

It will be noted from this structure that during rotation of the bar 13, the centrifugal action of the weight 30 will be exerted in the direction of the arrow 31, thereby insuring that the pin 27 will remain within the opening 26 at all times, the slight frictional engagement of the pin 27 with the opening 26 assisting in the action, and when it is desired to remove the blade elements 21, the pins 27 can be moved in the direction of the arrow 32, the collar 28 preventing complete removal, and in this way the pins 14 can be readily removed for the same purpose as above described.

A further modification along the same lines is disclosed in Figures 5 and 6 in which the pin 14b includes an annular groove 33 in which slides a flat bar 34 having a stop member 35 attached thereto, the member 35 being slidably engaged within the keeper 36 which is attached to the bar 13, the member 34 terminating in the weighted portion 37, it being noted that this structure also will provide the same result of maintaining the locking action of the pins 14, and although I have described two modifications of the centrifugal action in locking the pins 14, it will be understood that other forms could be used as well.

It will now be seen that I have provided the various advantages set forth in the objects of my invention with various other advantages being readily apparent.

Some changes may be made in the construction and arrangement of the parts of my invention without departing from the real spirit and purpose of my invention, and it is my intention to cover by my claim any modified forms of structure or use of mechanical equivalents which may be reasonably included within their scope.

I claim as my invention:

A rotary lawn mower blade structure comprising a horizontally positioned bar, a pair of triangular cutting blades having opposed cutting edges, said cutting blades each having a pair of spaced openings, pins passing through either of said openings and through the ends of said bar whereby either of the cutting edges of said cutting blades will be positioned for cutting action, means for locking said pins within said bar including a pair of spring urged members having extremities received through said pins, said spring-urged members being secured at one end to said bar.

References Cited in the file of this patent

UNITED STATES PATENTS

| | | |
|---|---|---|
| 2,476,394 | Webb et al. | July 19, 1949 |
| 2,484,511 | Ingalls | Oct. 11, 1949 |
| 2,529,797 | Cauble | Nov. 14, 1950 |
| 2,529,870 | Golasky | Nov. 14, 1950 |
| 2,654,986 | Gold | Oct. 13, 1953 |
| 2,669,084 | Warren | Feb. 16, 1954 |
| 2,697,323 | Horn | Dec. 21, 1954 |
| 2,716,323 | Ford | Aug. 30, 1955 |
| 2,721,438 | O'Maley | Oct. 25, 1955 |
| 2,737,772 | Jacobsen | Mar. 13, 1956 |
| 2,740,249 | Stearns | Apr. 3, 1956 |